US010528769B2

(12) United States Patent
Abnett

(10) Patent No.: US 10,528,769 B2
(45) Date of Patent: *Jan. 7, 2020

(54) METHOD AND APPARATUS FOR DESTROYING NONVOLATILE COMPUTER MEMORY

(71) Applicant: Albert C. Abnett, Nevada, OH (US)

(72) Inventor: Albert C. Abnett, Nevada, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,815

(22) Filed: May 7, 2019

(65) Prior Publication Data

US 2019/0258831 A1 Aug. 22, 2019

Related U.S. Application Data

(63) Continuation-in-part of application No. 15/657,167, filed on Jul. 23, 2017, now Pat. No. 10,282,565.

(51) Int. Cl.
*G06F 21/00* (2013.01)
*G06F 21/79* (2013.01)
*G06F 21/60* (2013.01)
*G06F 21/86* (2013.01)

(52) U.S. Cl.
CPC ............ *G06F 21/79* (2013.01); *G06F 21/604* (2013.01); *G06F 21/86* (2013.01); *G06F 2221/2143* (2013.01)

(58) Field of Classification Search
CPC .......... G06F 21/86; G06F 21/60; G06F 21/78; G06F 21/604; G06F 2221/2143
USPC .......................................................... 726/7
See application file for complete search history.

(56) References Cited

U.S. PATENT DOCUMENTS

| | | | | |
|---|---|---|---|---|
| 3,745,896 A | * | 7/1973 | Sperti | H05B 41/32 315/241 P |
| 6,240,027 B1 | * | 5/2001 | Lee | G11C 5/145 326/80 |
| 6,667,909 B2 | * | 12/2003 | Fournel | G11C 16/0408 257/315 |
| 9,704,586 B1 | * | 7/2017 | Kao | G11C 16/30 |
| 2006/0060906 A1 | * | 3/2006 | Sommer | H01L 27/10897 257/301 |
| 2006/0117393 A1 | * | 6/2006 | Merry, Jr. | G06F 12/1433 726/34 |
| 2006/0133178 A1 | * | 6/2006 | Salessi | G11C 16/225 365/226 |
| 2009/0052227 A1 | * | 2/2009 | Edahiro | G11C 13/0007 365/148 |

(Continued)

*Primary Examiner* — Syed A Zaidi
(74) *Attorney, Agent, or Firm* — Robinson IP Law, PLLC; Matthew M. Googe

(57) ABSTRACT

A computer security device for protecting sensitive data stored in nonvolatile memory in a computer includes: an overvoltage generator comprising a high-voltage supply charging a capacitor through a resistor, wherein the capacitor is in electronic communication with the nonvolatile memory of the computer through a silicon-controlled rectifier; and a controller operable to receive a signal and in electronic communication with the overvoltage generator, wherein the controller is operable to produce a destruct signal. The generator is operable to apply an over-voltage condition to the nonvolatile memory of the computer through the silicon-controlled rectifier upon receiving the destruct signal from the controller.

6 Claims, 8 Drawing Sheets

(56) References Cited

U.S. PATENT DOCUMENTS

| | | | | |
|---|---|---|---|---|
| 2011/0317472 A1* | 12/2011 | Awaya | ............... | G11C 13/0069 365/148 |
| 2012/0151121 A1* | 6/2012 | Braga | ..................... | G06F 21/79 711/103 |
| 2013/0010530 A1* | 1/2013 | Katayama | .......... | G11C 13/0007 365/148 |
| 2018/0323576 A1* | 11/2018 | Crawford | .............. | H02M 1/088 |

* cited by examiner

METHOD AND APPARATUS FOR DESTROYING NONVOLATILE COMPUTER MEMORY

CROSS-REFERENCE TO RELATED APPLICATIONS

This application claims priority to and is a continuation-in-part of U.S. application Ser. No. 15/657,167 for a "Computer Security Environment" filed on Jul. 23, 2017, the contents of which are incorporated herein by reference in its entirety.

FIELD

This disclosure relates to the field of computer security. More particularly, this disclosure relates to a computer security environment that denies an intruder's access to nonvolatile computer memory, containing sensitive data, by destroying the nonvolatile memory.

BACKGROUND

As computers have become more pervasive, they increasingly contain sensitive information that can compromise the owner, if that data falls into the wrong hands. Examples of sensitive data would be business data, product design data, attorney client privileged data, to name a few.

Serious data breeches regularly result from web attacks on internet connected computers and consequently many security related inventions address security from internet attacks. Data may be encrypted and otherwise protected when it is stored in computer memory and not actively being created or modified.

While data is actively being created or modified, it generally exists in the clear, not encrypted or otherwise obscured. The current invention is directed at protecting sensitive computer data that exists in the clear and is not otherwise protectable by encryption or obscuration. Without protection from physical access, attackers can gain access to and potentially copy sensitive data stored in nonvolatile computer memory.

SUMMARY

The above and other needs are met by a computer security device for destroying memory of a computer device. In a first aspect, a computer security device for protecting sensitive data stored in nonvolatile memory in a computer includes: an overvoltage generator comprising a high-voltage supply charging a capacitor through a resistor, wherein the capacitor is in electronic communication with the nonvolatile memory of the computer through a silicon-controlled rectifier; a controller operable to receive a signal and in electronic communication with the overvoltage generator, the controller being operable to produce a destruct signal. The generator is operable to apply an over-voltage condition to the nonvolatile memory of the computer through the silicon-controlled rectifier upon receiving the destruct signal from the controller to prevent access to the sensitive data stored on the nonvolatile memory of the computer.

In one embodiment, the overvoltage generator further includes one or more relays for applying at least a first overvoltage and a second overvoltage to the nonvolatile memory upon receiving the destruct signal, wherein the second overvoltage is a higher voltage than a voltage of the first overvoltage. In another embodiment, the one or more relays include a first isolation relay in electronic communication with a memory data line of the nonvolatile memory and a second isolation relay in electronic communication with a power supply line of the nonvolatile memory.

In a second aspect, a method of applying an overvoltage condition to nonvolatile memory of a computer to destroy sensitive data stored on the nonvolatile memory includes the steps of: providing an overvoltage generator including a high-voltage supply charging a capacitor through a resistor, the capacitor in electronic communication with the nonvolatile memory of the computer through a silicon-controlled rectifier; providing a controller in electronic communication with the overvoltage generator; transmitting a destruct signal from the controller to the overvoltage generator; and upon receiving the destruct signal from the overvoltage generator, applying an overvoltage condition to the nonvolatile memory of the computer through the silicone-controlled rectifier to prevent access to the sensitive data stored on the nonvolatile memory of the computer.

In one embodiment, the method of applying an overvoltage condition further includes: providing at least a first isolation relay in communication with the nonvolatile memory and a second isolation relay in communication with the nonvolatile memory; sensing a voltage level of the capacitor of the overvoltage generator; activating the high-voltage supply of the overvoltage generator until a charge of the capacitor reaches a first voltage level; closing one of the first isolation relay and second isolation relay to the nonvolatile memory; pulsing the overvoltage generator to discharge the capacitor into the nonvolatile memory; activating the high-voltage supply of the overvoltage generator until a charge of the capacitor reaches a second voltage level that is greater than the first voltage level; closing another of the first isolation relay and second isolation relay to the nonvolatile memory; and pulsing the overvoltage generator to discharge the capacitor into nonvolatile memory.

In a third aspect, a computer security device for protecting sensitive data stored in nonvolatile memory in a computer includes: an overvoltage generator comprising a high-voltage supply charging a capacitor through a resistor; a controller operable to receive a signal and in electronic communication with the overvoltage generator, wherein the controller is operable to produce a destruct signal. The generator is operable to apply a first over-voltage condition to the nonvolatile memory of the computer through the silicon-controlled rectifier and a second over-voltage condition to the nonvolatile memory of the computer upon receiving the destruct signal from the controller to prevent access to the sensitive data stored on the nonvolatile memory of the computer. The second over-voltage condition has a greater voltage than the first over-voltage condition.

In one embodiment, the first over-voltage condition has a voltage of from about 8V to about 12V.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

An object of embodiments of the present disclosure is to keep sensitive data, stored in nonvolatile memory in use within a computer system, from falling into the wrong hands due to a physical security breech, by destroying the nonvolatile memory. That is, an apparatus and method to detect a security breech and respond by permanently damaging the nonvolatile memory.

Figure 1:
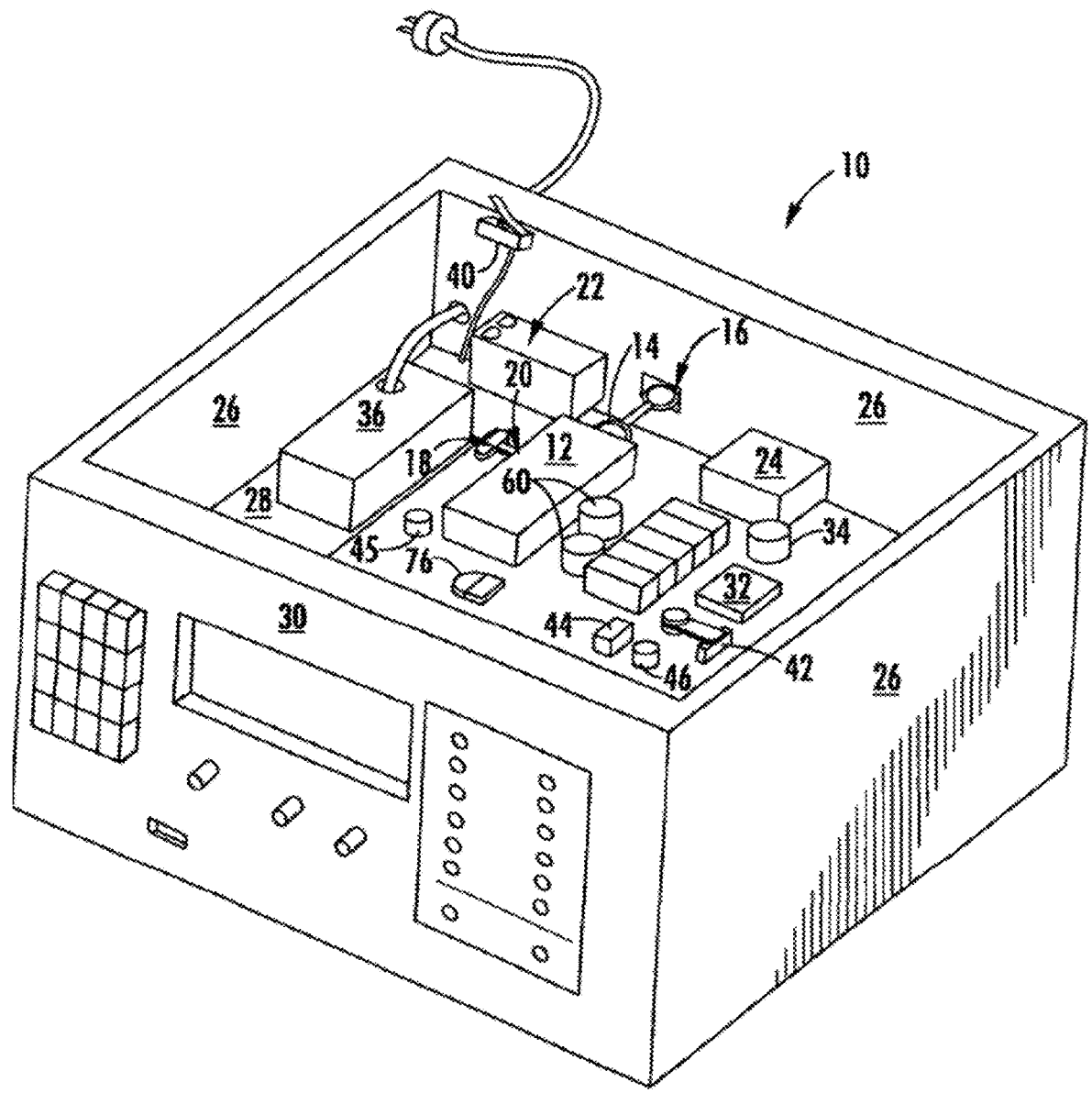
FIG. 1 is a perspective view of an apparatus for destroying nonvolatile computer memory according to one embodiment of the present disclosure.

FIG. 1 provides a perspective view of a computer security environment 10 according to an exemplary embodiment of the present subject matter. Computer security environment 10 is provided by way of example only and is not intended to limit the present subject matter in any aspect. Thus, the present subject matter may be used with other security environment configurations, e.g., that define a different computer arrangement and/or different intrusion sensors or arrangement of those sensors and/or a different user interface as presented to the user via the front panel.

In this embodiment, a computer system is protected by the security environment. The protected computer system is an Intel Compute Stick 12 comprising a CPU, RAM, Flash memory, an HDMI display interface, USB interfaces, Wi-Fi, and Bluetooth. The flash memory is nonvolatile memory. Nonvolatile memory comprises memory implemented in one or more semiconductor chips, which may be flash memory chips. Nonvolatile memory maintains memory contents across power cycles. The computer uses nonvolatile memory to store files that may contain sensitive data. Sensitive data is data that needs to be protected. Nonvolatile memory chips include electronic parts that have data lines that convey data into and out of the chip. The nonvolatile memory chips also have power inputs that expect a specific constant voltage during operation.

To make an operational computer system, a monitor or display (not shown) is connected to the protected computer system through HDMI display interface 14 and HDMI extension cable 16, a keyboard, mouse, or other input devices (not shown) are connected through RF interface 18 plugged into USB interface 20 and a network connection is made through an on-board WiFi interface. Peripheral components such as the monitor, keyboard and mouse are not part of the protected computer system, however it is understood that such peripheral components may be built-in to the protected computer system. Compute Stick 12 runs one or more software programs which may create or access sensitive data stored in nonvolatile memory. The computer system is powered by battery 22 through power supply 24 which supplies power to Compute Stick 12.

Security environment 10 has an enclosure comprising sides 26, bottom 28, front panel 30 and a lid (not shown) that covers security environment 10. The enclosure limits physical access to security environment 10 and forms a perimeter to be defended. An intrusion of security environment 10 is a breach of the enclosure or an attempt to gain access to the contents of security environment 10.

Security environment 10 intrusion is detected by deploying one or more intrusion sensors within security environment 10 or surrounding security environment 10. When an intrusion sensor detects an intrusion, it is an intrusion condition. Intrusion conditions are communicated to processor 32 via detection signals. Processor 32 evaluates the detection signals against an intrusion profile. The intrusion profile defines the intrusion conditions currently used to generate a destruct signal.

Microswitch 40 is an intrusion sensor that detects an opening in security environment 10 when the lid is open or removed. Microswitch 40 sends a detection signal to processor 32.

Vibration sensor 42 is an example of an intrusion sensor that detects a high vibration condition within security environment 10. A high vibration condition could be caused by someone drilling through the lid of security environment 10. Vibration sensor 42 sends a detection signal to processor 32.

Tilt sensor 44 is another example of an intrusion sensor that detects when security environment 10 is not sitting level. A tilt detection could result if security environment 10 was lift up to look for an entry point. Tilt sensor 44 sends a detection signal to processor 32.

Figure 2:
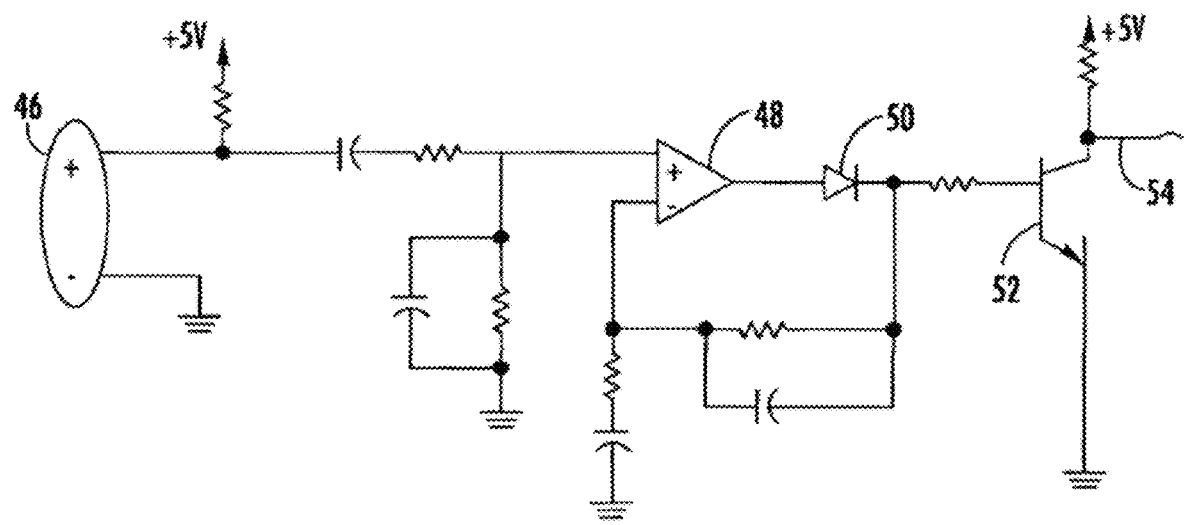
FIG. 2 depicts a schematic of the microphone and conditioning circuitry of the noise detection intrusion sensor according to one embodiment of the present disclosure.

Microphone 46 is yet another intrusion sensor that detects a high noise level within security environment 10. Referring to FIG. 2, microphone 46 picks up sound within security environment 10, which is amplified by op amp 48 in a three-pole low-pass filter configuration. Diode 50 rectifies the filtered sound output and transistor 52 digitizes the detection signal which is sent to processor 32 via output 54. The microphone circuit is preferably most sensitive to low frequencies present for intrusions involving sawing or drilling into the enclosure.

Photosensor 45 is yet another example of an intrusion sensor that detects light in security environment 10. When light is detected in security environment 10, a detection signal is sent to processor 32.

A low-battery detector (not shown) is another example of an intrusion sensor because the power has been removed for long enough to discharge the battery. The low-battery threatens the system because once the battery completely discharges, the system is no longer protected. The low-battery condition triggers a detection signal to processor 32.

Figure 3:
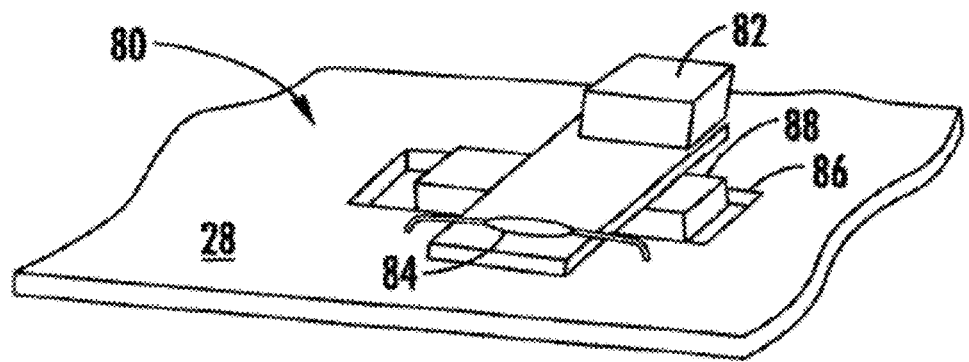
FIG. 3 depicts a location intrusion sensor that detects movement according to one embodiment of the present disclosure.

Location sensor 80 is an intrusion sensor that detects movement of security environment 10. Referring to FIG. 3 permanent magnet 82 and reed switch 84 straddle slot 86 cut into security environment bottom plate 28. Ferrous metal block 88, secured to a surface on which security environment 10 sits (not shown), confines the flux from magnet 82 such that reed switch 84 is open. If security environment 10 is moved off ferrous metal block 88, the flux from permanent magnet 82 activates reed switch 84 and sends a detection signal to processor 32.

A remote destruction trigger may be implemented by placing a cellphone within audio range of microphone 46. Processor 32 is programmed to identify a particular ring tone. Requiring multiple calls, three for example, within a limited time, a minute for example, reduces the possibility of a false trigger. When the triggering sequence is detected by processor 32, the destruct signal is generated.

Processor 32 generates a destruct signal based on the current intrusion conditions evaluated against the intrusion profile. The intrusion profile determines which intrusion conditions are armed to generate a destruction signal. Some of the intrusion conditions cause the destruct signal to be generated immediately upon detection. In particular, the case intrusion condition generated by microswitch 40 and the low-battery condition cause the destruct signal to be generated immediately. The remaining intrusion conditions have a delay such that beeper 34 is activated upon the detection of the intrusion condition, but the destruct signal is delayed by a time that allows an operator with a security code to cancel the current intrusion condition before the destruct signal is generated.

Figure 4:
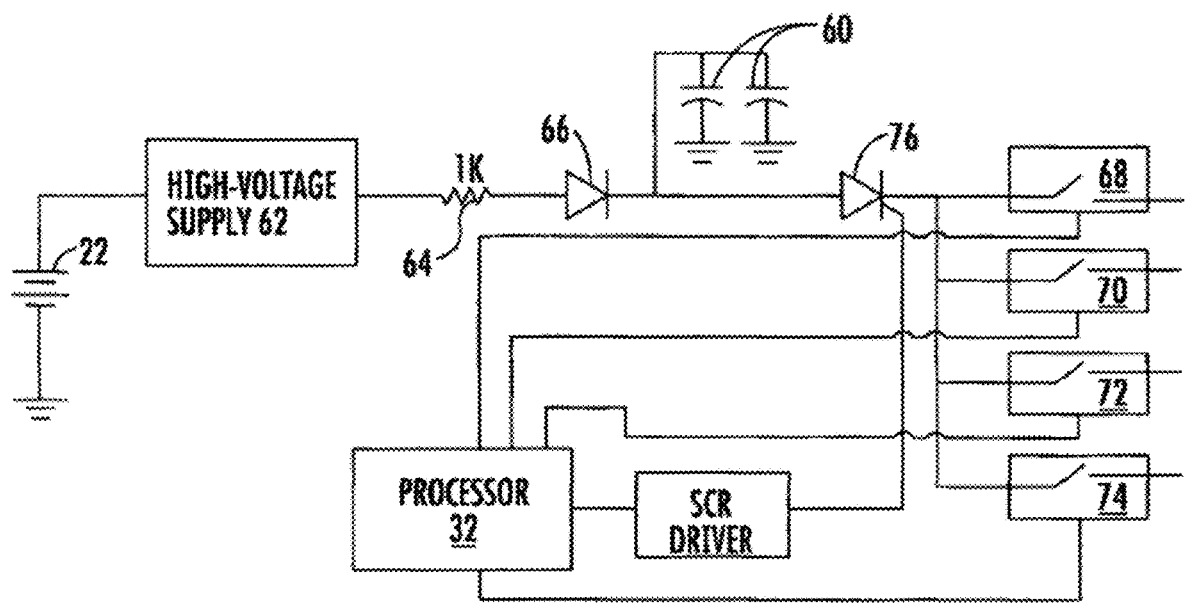
FIG. 4 is a schematic view of an over-voltage generator according to one embodiment of the present disclosure.

FIG. 4 shows a part of the circuit used to damage the nonvolatile memory. High voltage supply 62 is powered by battery 22 and charges capacitors 60 to 60 volts through resistor 64 and diode 66. When a destruct signal is generated, the high voltage from capacitors 60 is connected to relays 68, 70, 72, and 74 through silicon controlled rectifier ("SCR") 76. Relays 68-74 are individually energized by processor 32 to switch the high voltage to individual nonvolatile memory data lines and the nonvolatile memory power input. Applying the high voltage from capacitors 60 to the data lines and to the power supply input, and discharging the energy stored in capacitors 60 through the data lines and power input of the nonvolatile memory damages the nonvolatile memory so that the memory cannot be accessed later to read the sensitive data contained therein. Capacitors 60 are recharged between application of the high voltage so that each of the lines selected by relays 68-74 is destroyed. The charging time constant is approximately 1 second, so processor 32 waits 5 seconds between application of a high voltage discharge. Capacitors 60 sum to approximately 1000 microfarads of capacitance. This value was empirically determined to provide enough energy to permanently damage the chip to which a high voltage discharge is applied. Relay 68 is used to apply a high voltage discharge to the nonvolatile memory power input. Relay 70 is used to apply a high voltage discharge to a USB interface data line. Relay 72 is used to apply a high voltage discharge to a nonvolatile memory data line. Relay 74 is used to apply a high voltage discharge to a RAM memory data line.

Upon completing the destruct sequence above, computer system 12 and its associated memory are no longer functional, and the sensitive data stored in nonvolatile memory is no longer accessible.

Figure 5:
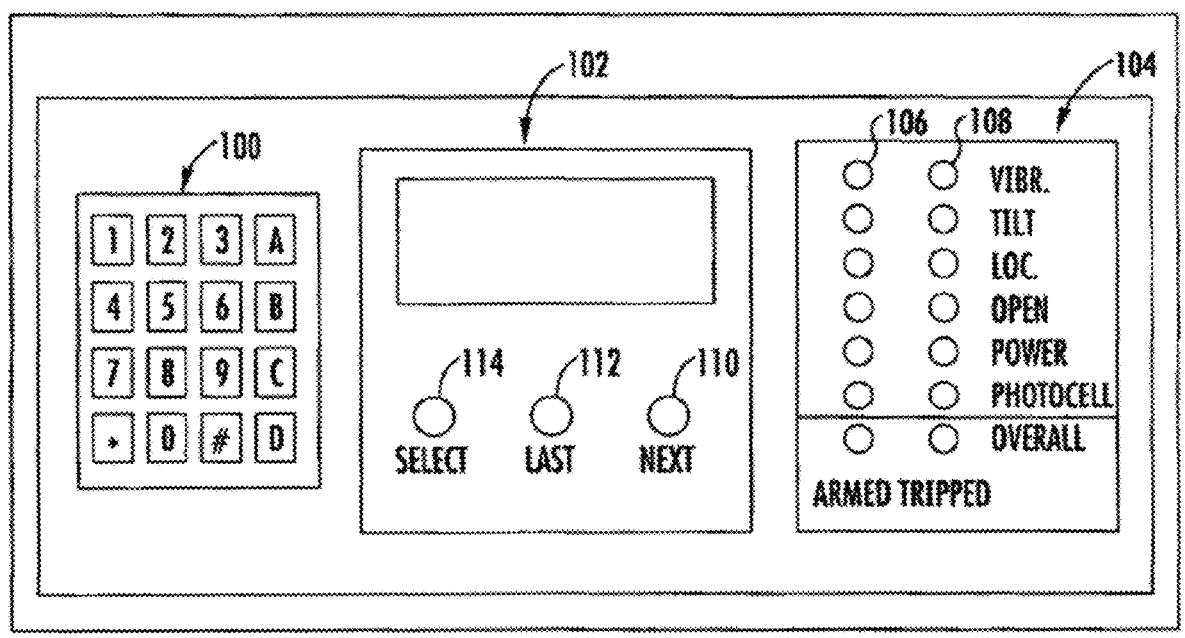
FIG. 5 depicts a front panel and user interface according to one embodiment of the present disclosure.

FIG. 5 shows the front panel 30 of Security environment 10. Front panel 30 is used by an operator to select the intrusion profile and to enter a code to cancel a destruct sequence. Front panel 30 is divided into three sections, keyboard 100, display 102 and status display 104. Keyboard 100 is used to cancel and activate destruct signal. Display 102 displays input from keyboard 100 and is used to interactively define the intrusion profile. Status display 104 shows the currently selected intrusion profile.

Status display 104 has two columns of LEDs, the armed column and the tripped column. The LEDs in armed column 106 indicate that the associated intrusion sensor is enabled in the current intrusion profile. The LEDs in the tripped column indicate that the associated intrusion sensor has detected an intrusion condition. A sensor must be armed for the destruct signal to be triggered by the associated intrusion condition. The armed LED in the bottom row indicates whether any sensors are armed in the current intrusion profile. The tripped LED in the bottom row indicates that a destruct signal is active, i.e., that one or more intrusion sensors are both armed and are detecting an intrusion condition.

While interactively defining the intrusion profile, display 102 displays the current sensor. Pressing button 110 scrolls forward in the list of sensors displayed in status display 104 to the next sensor. Pressing button 112 scrolls back in the list of sensors display in status display 104 to the previous sensor. Pressing button 114 toggles the armed status of the currently displayed intrusion sensor.

Once a destruct signal is generated, unless the destruct is immediate, beeper 34 sounds and an operator who knows the cancel code has 1 minute to enter the code before the destruct sequence begins. There is also a profile code which enables modification of the intrusion profile.

Figure 6:
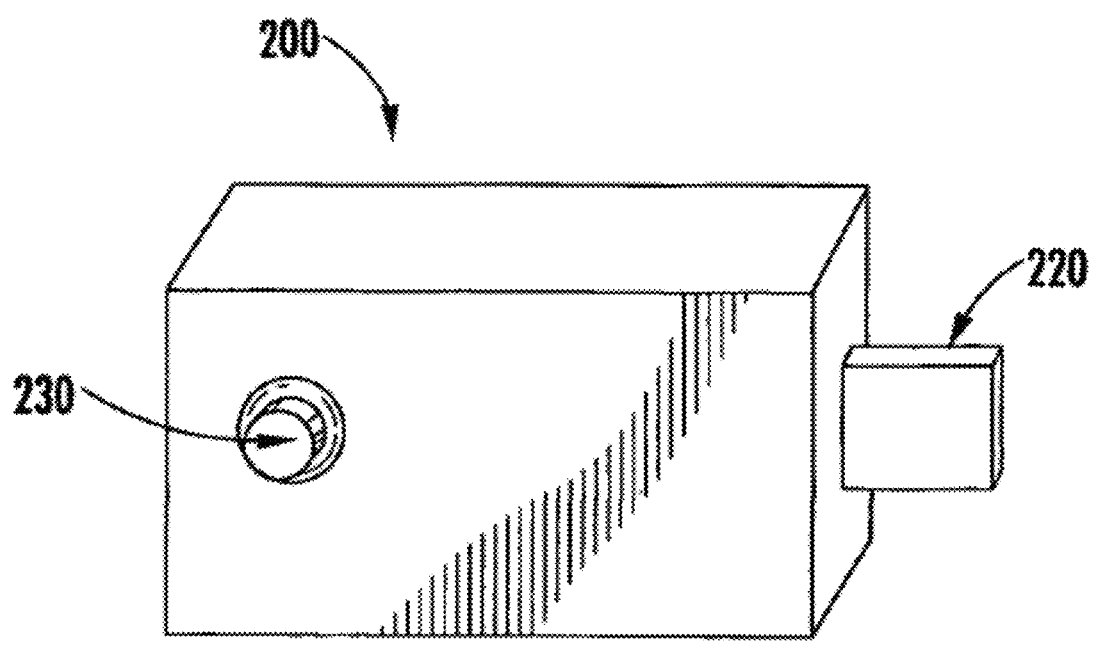
FIG. 6 depicts a thumb drive according to one embodiment of the present disclosure.

In another embodiment of the current invention, refer now to FIG. 6, self-destructing thumb drive 200. Thumb drive 200 is used to store computer data, which may be sensitive data. The use of thumb drives to provide computers with easily transportable storage or as backup data storage is well known in the art. Self-destructing thumb drive 200 operates much as a common thumb drive for the purpose of storing and retrieving data when USB connector 220 is plugged into a compatible computer. Button 230 provides an input to allow a destruction request sequence to be entered into thumb drive 200 for the purpose of protecting sensitive data contained therein. Entry of the destruction request sequence would generally be invoked when thumb drive 200 is not plugged into a computer and is being used for backup or transport.

Figure 7:
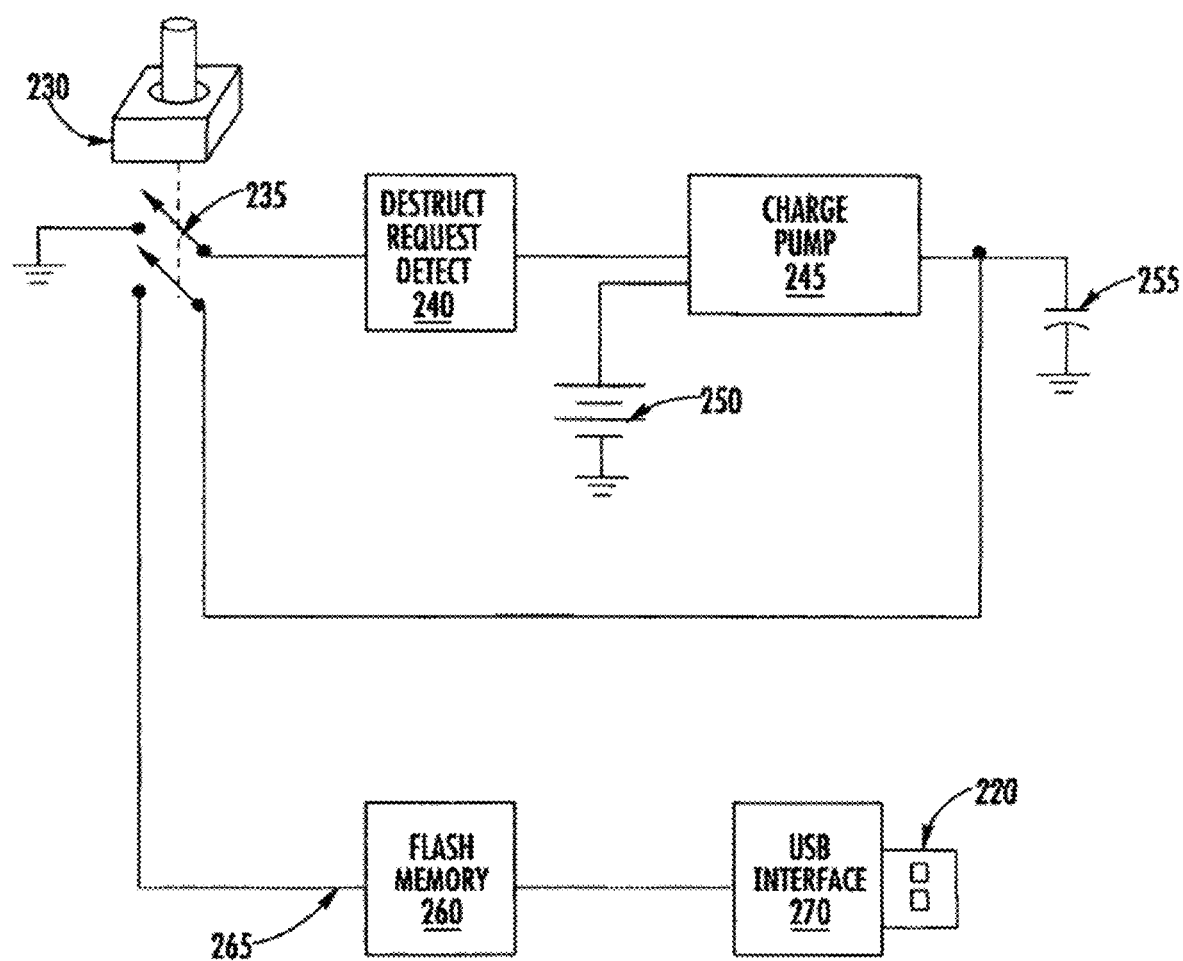
FIG. 7 depicts a block diagram of a thumb drive according to one embodiment of the present disclosure.

Referring to FIG. 7, data storage is accomplished via USB connector 220, USB interface 270 and flash memory 260. The embodiment uses flash memory and a USB interface, but other nonvolatile memory technologies could be used in place of the flash memory and other interfaces could be used in place of USB within the broad outline of the current invention.

During activation of the self-destructing aspect of thumb drive 200, switch 235 is activated through button 230 for entry of the destruction request sequence. In the embodiment, the destruction request sequence consists of three closures of switch 235. Entry of two switch closures within one second is detected by destruct request detector 240, which turns on charge pump 245. Charge pump 245 uses energy from battery 250 and charges capacitor 255 up to 80 volts. The third switch closure of switch 235 conveys the voltage from capacitor 255 to data line 265 of flash memory 260, destroying flash memory 260. The value of capacitor 255 was chosen as 200 microfarad to provide enough energy to burnout data line 265. Charge pump 245 uses a flyback circuit to provide current at 80 volts to charge capacitor 255. Examples of suitable Flyback technology are well known in the art and suitable for use with embodiments described herein.

Some preferred embodiments enable destruction of nonvolatile memory in stationary and mobile devices such as cell phones, flash drives, SSD drives, and derivatives there from. Those skilled in the art understand how these embodiments can be applied to a wide range of computer processing unit enabled and connected memory devices.

A memory killer device may employ a sequence of operation. For example, a sequence may comprise:

Turn on high voltage power supply until capacitor voltage reaches V1, as per sense line into analog to digital converter, Close one of the isolation relays into a memory data line, Pulse the SCR discharging the capacitor into the memory data line, Turn on high voltage power supply again charging capacitor to V1 again, Close isolation relay into target power supply line, and Pulse the SCR to discharge capacitor into a memory power supply.

Repeat a sequence such as this one for V2 and V3 or as many steps as desired to max voltage.

Apply a sequence such as the above to each data line and each power supply as appropriate. For example, this applies to a connection to the memory through a USB port which has D1, D2, V, Gnd connections. If the circuit were, for instance, included within a cell phone then the memory lines could be accessed directly.

The SCR is a discharge switch with very low resistance at high currents. It typically stays turned on until no current is flowing to ensure complete discharge of capacitor. Many SCR units handle very large short-term current spikes.

There are stepped up voltage bursts. A final intent is to apply the highest voltage to the target memory lines but depending on design of the target the highest voltage may cause arc-over at the connector or between printed circuit traces before reaching into the actual memory chip. When this occurs, experience has shown there may be left a carbon trace which will short out future pulses.

One element of embodiments described herein is to start with a low voltage pulse and successively increase the magnitude with multiple pulses. The first pulse (around 10 volts) may be enough to write over the solid-state memory cells without actual destruction, which would still destroy any stored information. But eventually the application of the highest voltage pulse applied in a short burst will fry the chip beyond any recovery.

An example for a calculated measure of an energy pulse.

Capacitor=1000 ufd, Series Discharge Resistance=0.2 ohms, 65 volts

Energy=½ $CV^2$=(0.5)(0.001)(65)(65)=2.11 Joules

Discharge Pulse Width~RC=(0.001)(0.2)=200 microseconds

Power=E/t=2.11/0.0002=10,560 watts!

By applying 10 kW (14 hp) of electrical energy spikes to tiny memory lines destruction of the nonvolatile memory is assured.

Figure 8:
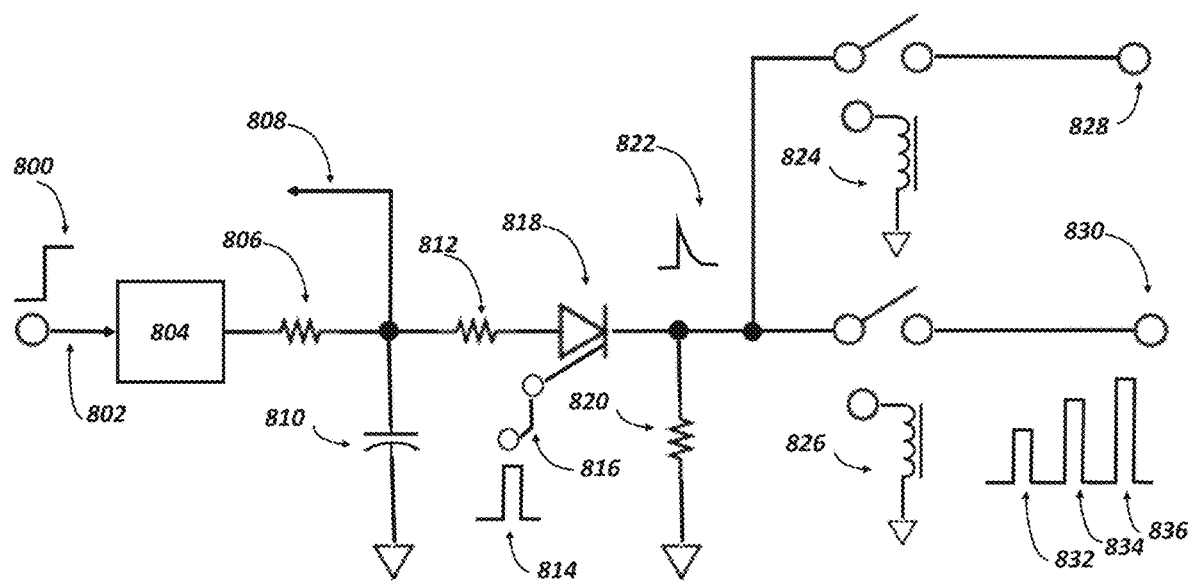
FIG. 8 shows use of a silicone controlled rectifier ("SCR") with multiple energy pulses according to one embodiment of the present disclosure.

An example of SCR producing multiple energy pulses is shown in FIG. 8. Item 800 shows a step increase in voltage when instruction 802 to turn on a high voltage power supply is made. Item 804 is a high voltage power supply such as a 65 V power supply. Items 806, 812, and 820 are resistors. Item 808 V-sense which senses a voltage level at SCR capacitor 810. Item 814 represents a high intensity energy pulse from the SCR. Item 816 fires the pulse via diode 818. Item 818 depicts a feature for SCR, a nearly complete discharge of the capacitor. Items 824 and 826 are first and second relays respectively. Item 828 is discharge to a power line, and item 830 is discharge to a data line. Item 832 indicates an energy pulse based on an initial V-sense voltage V1, 834 energy pulse at relatively higher voltage V2, and 836 energy pulse at an even higher voltage v3.

Figure 9:
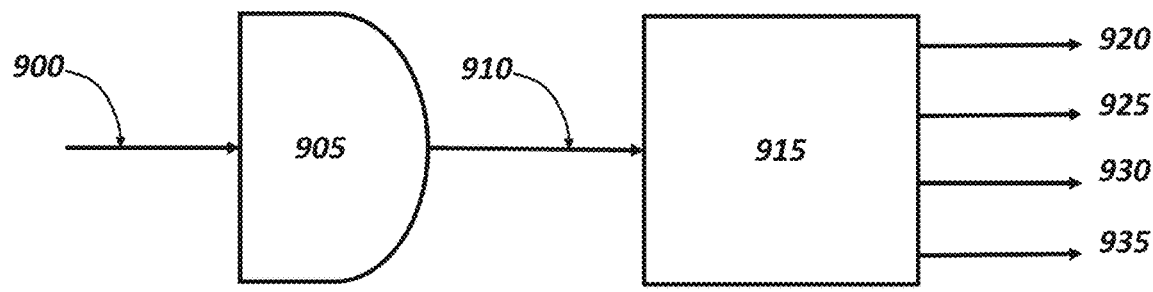
FIG. 9 depicts processor control for multiple energy pulses according to one embodiment of the present disclosure.

The FIG. 8 diagram is logically associated with FIG. 9 processor control with multiple energy pulses. Item 900 represents V-sense, a measure of the voltage level for SCR capacitor charging status. Item 905 is an analog to digital conversion of the analog V-sense and 910 is a link between an analog-to-digital converter and the processor 915. Items 929, 925, 939, and 935 represent four different logical instructions from the processor to turn on the high voltage power supply, to activate the first relay, to activate the second relay, and to fire an energy pulse, respectively.

Figure 10:
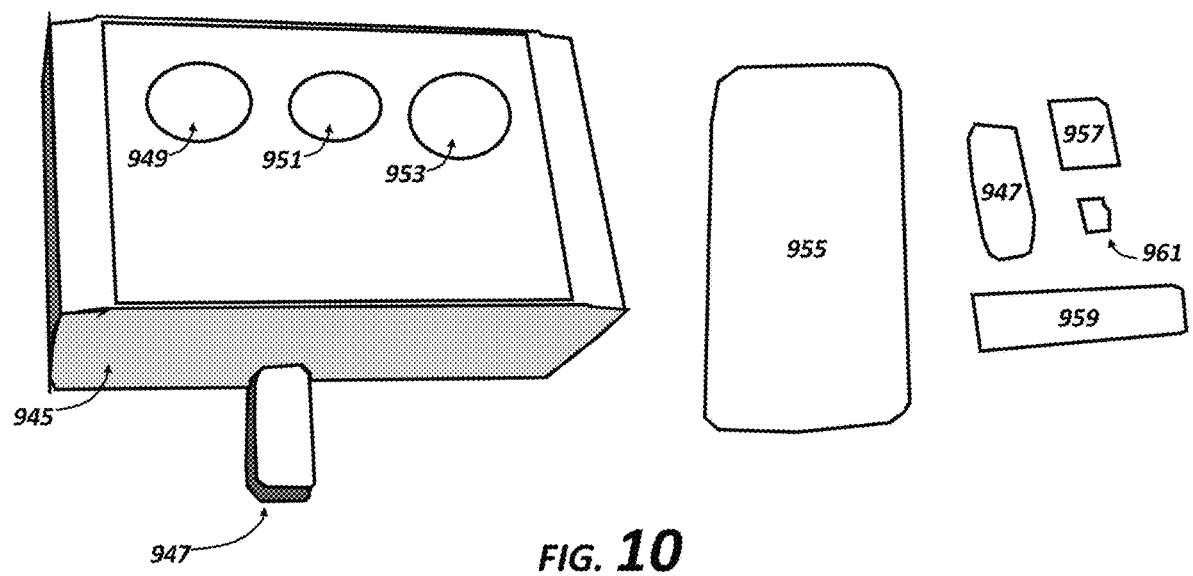
FIG. 10 illustrates a device for destroying memory according to one embodiment of the present disclosure.

A preferred embodiment device is outlined in FIG. 10. Item 945 is one example of a device for destroying a mobile device or flash memory before it is discarded thereby protecting privacy and valuable digital information. Item 947 is a USB flash drive inserted for memory destruction. Item 949 is a power on button. Item 951 is an indicator showing status of an operation such as a charging condition for energy storage device such as an SCR capacitor. Item 953 is a button to instruction, "kill memory." Memory destruction using a device according to embodiments herein applies to many types and sizes of electronic memory devices including 955 cell phone, 957 SD card, 959 circuit board, and 961 micro memory card.

A memory killer device operates quickly. In seconds, it destroys obsolete backups, discarded phones, replacement memory devices, trade secrets, prevents identity theft from dumpster divers, the high-voltage destruction method destroys internal memory circuits in seconds.

Adapters may be used for Cell Phones, Flash Drives, most memory types including SSDs, SD cards. This renders electronic mobile devices completely inoperative, and USB.

Example of a typical simple operation sequence. Select an adapter that fits your memory and plug it into the Killer's USB port. Press the White Power-On Button. Wait a couple seconds for Yellow Light to indicate the internal capacitors are charged. Press the Red Button. The memory is then quickly destroyed.

Example physical specifications for a preferred embodiment. See FIG. 10.

Dimensions: 6.25×3.875×2.50 inches

External 110/220 VAC Power Supply

Splash Proof 3 seconds to destroy memory

Adapters for SD cards, SSD, USB flash drives, iPhones, Androids, and others.

Preferred embodiments typically prescribe SCR type circuits. Less preferred embodiments may include an alternative to the SCR such as 1) bipolar transistor, 2) FET, 3) Relay contacts, 4) Pushbutton. In each of these devices they must be held on by their trigger signal for appropriate time. With the SCR a short trigger is enough to start conduction which will continue ON until capacitor is completely discharged.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A computer security device for protecting sensitive data stored in nonvolatile memory in a computer, the computer security device comprising:
    an overvoltage generator comprising a high-voltage supply charging a capacitor through a resistor, wherein the capacitor is in electronic communication with the nonvolatile memory of the computer through a silicon-controlled rectifier;
    a controller operable to receive a signal and in electronic communication with the overvoltage generator, wherein the controller is operable to produce a destruct signal;
    wherein the generator is operable to apply an over-voltage condition to the nonvolatile memory of the computer through the silicon-controlled rectifier upon receiving the destruct signal from the controller to prevent access to the sensitive data stored on the nonvolatile memory of the computer.

2. The computer security device of claim 1, the overvoltage generator further comprising one or more relays for applying at least a first overvoltage and a second overvoltage to the nonvolatile memory upon receiving the destruct signal, wherein the second overvoltage is a higher voltage than a voltage of the first overvoltage.

3. The computer security device of claim 2, the one or more relays comprising a first isolation relay in electronic communication with a memory data line of the nonvolatile memory and a second isolation relay in electronic communication with a power supply line of the nonvolatile memory.

4. A method of applying an overvoltage condition to nonvolatile memory of a computer to destroy sensitive data stored on the nonvolatile memory, the method comprising the steps of:
    providing an overvoltage generator including a high-voltage supply charging a capacitor through a resistor, the capacitor in electronic communication with the nonvolatile memory of the computer through a silicon-controlled rectifier;
    providing a controller in electronic communication with the overvoltage generator;
    transmitting a destruct signal from the controller to the overvoltage generator;
    upon receiving the destruct signal from the overvoltage generator, applying an overvoltage condition to the nonvolatile memory of the computer through the silicone-controlled rectifier to prevent access to the sensitive data stored on the nonvolatile memory of the computer.

5. The method of applying an overvoltage condition of claim 4, further comprising:
    providing at least a first isolation relay in communication with the nonvolatile memory and a second isolation relay in communication with the nonvolatile memory;
    sensing a voltage level of the capacitor of the overvoltage generator;
    activating the high-voltage supply of the overvoltage generator until a charge of the capacitor reaches a first voltage level;
    closing one of the first isolation relay and second isolation relay to the nonvolatile memory;
    pulsing the overvoltage generator to discharge the capacitor into the nonvolatile memory;
    activating the high-voltage supply of the overvoltage generator until a charge of the capacitor reaches a second voltage level that is greater than the first voltage level;
    closing another of the first isolation relay and second isolation relay to the nonvolatile memory;
    pulsing the overvoltage generator to discharge the capacitor into nonvolatile memory.

6. A computer security device for protecting sensitive data stored in nonvolatile memory in a computer, the computer security device comprising:
    an overvoltage generator comprising a high-voltage supply charging a capacitor through a resistor;
    a controller operable to receive a signal and in electronic communication with the overvoltage generator, wherein the controller is operable to produce a destruct signal;
    wherein the generator is operable to apply a first overvoltage condition of from about 8V to about 12V to the nonvolatile memory of the computer through the silicon-controlled rectifier and a second over-voltage condition to the nonvolatile memory of the computer upon receiving the destruct signal from the controller to prevent access to the sensitive data stored on the nonvolatile memory of the computer, wherein the second over-voltage condition has a greater voltage than the first over-voltage condition.

* * * * *